United States Patent [19]

Hoogenboom

[11] Patent Number: 4,692,611

[45] Date of Patent: Sep. 8, 1987

[54] FIBER OPTIC PROXIMITY SENSOR WITH FEEDBACK SERVO IMAGING MEANS

[75] Inventor: Leo Hoogenboom, Ballston Lake, N.Y.

[73] Assignee: Mechanical Technology Incorporated, Latham, N.Y.

[21] Appl. No.: 823,600

[22] Filed: Jan. 29, 1986

[51] Int. Cl.$^4$ .......................... H01J 5/16; H01J 40/14
[52] U.S. Cl. ...................................... 250/227; 250/561
[58] Field of Search .......... 250/227, 201 PF, 201 DF, 250/231 R, 201 R, 561; 369/44, 45, 46; 354/403–407

[56] References Cited

U.S. PATENT DOCUMENTS

| | | | |
|---|---|---|---|
| 3,967,108 | 6/1976 | Hollis | 250/201 PF |
| 4,070,116 | 1/1978 | Frosch et al. | 250/201 R |
| 4,249,076 | 2/1981 | Bergstrom et al. | 250/227 |
| 4,289,959 | 9/1981 | Takayama et al. | 250/227 |
| 4,460,989 | 7/1984 | Russell | 250/201 DF |
| 4,492,860 | 1/1985 | Brogardh et al. | 250/231 R |
| 4,567,362 | 1/1986 | Kunz | 250/201 PF |
| 4,596,925 | 6/1986 | Gilby | 250/227 |

Primary Examiner—David C. Nelms
Assistant Examiner—William L. Oen
Attorney, Agent, or Firm—Joseph V. Claeys; Joseph C. Sullivan

[57] ABSTRACT

A proximity sensor is disclosed having two bifurcate fiber optical bundles arranged in parallel. Light is directed at a target by the bundles and the reflected light from the target is transmitted to two separate sensors. The output difference of the sensors is used to derive a control signal for tracking a target. The control signal has a null point and is used in a servo loop to keep the bundles at a constant distance from the target.

8 Claims, 4 Drawing Figures

FIBER OPTIC PROXIMITY SENSOR WITH FEEDBACK SERVO IMAGING MEANS

This application is related to U.S. application Ser. No. 823,599 titled "Fiber Optic Proximity Sensors For Narrow Target For Reflexivity Compensation" which has the same inventor and file date and is commonly assigned.

BACKGROUND OF THE INVENTION a. Field of Invention

This invention relates to an optical proximity sensor having two bifurcated optical bundles used in a servo loop.

b. Description of the Prior Art

Bifurcated optical fibers are frequently used in sensors to detect a distance to a target. Typically, one sensor bundle comprises two sets of fibers, each set originating from a respective arm, the two sets being joined in a common leg. Light is transmitted from a light source through one arm to the target and the corresponding light reflected from the target is conducted by the other arm to a light sensor. The intensity of the reflected light is indicative of the distance between the end of the common leg and the target. However, a direct measurement of the intensity has proven to be an unreliable parameter because of long and short term variations in the intensity of the light source, and variations in the reflectivity of the target. Numerous schemes have been devised in the past to overcome these problems. However, these schemes has proven to be unreliable and/or very expensive to implement.

For example, U.S. Pat. No. 4,269,512 to Nosler discloses an optical position monitor with a laser directed at a target (such as a log) and a detector assembly monitoring the log at an acute angle with respect to the laser. The detector assembly includes a carriage moving transversally with respect to the monitoring direction and housing two adjacent light sensors with optical fibers. This system is not capable of sensing very small distances.

U.S. Pat. No. 4,281,245 to Biogardh et al. discloses several configurations with two or more interconnected optical fiber bundles, an optical filter, and a switching mechanism for choosing between two light sources having different frequencies.

U.S. Pat. No. 4,220,850 to McEachern illustrates the use of two different photo arrays in an autofocusing apparatus.

There is a present need for an optical sensor capable of indicating a distance to a target which yields reliable, consistent and accurate results and is inexpensive to make.

SUMMARY OF THE INVENTION

In accordance with the present invention, an optical proximity sensor comprises an optical head movably disposed with respect to a target and two bifurcate optical fiber bundles arranged in parallel to direct light from a source to the target and to detect the corresponding reflected light from the target. Two light detectors are also provided to generate sensor signals corresponding to the reflected light picked up by the bundles. The bundles and sensors are arranged such that the output of the two sensors is at a minimum at separate points as the distance between the sensor head and target varies. The two sensor outputs are fed into a differential amplifier to obtain a control signal with a null point. The control signal is used by a servo loop to track the target by maintaining the sensor head at the null point.

THE INVENTION

Figure 1:
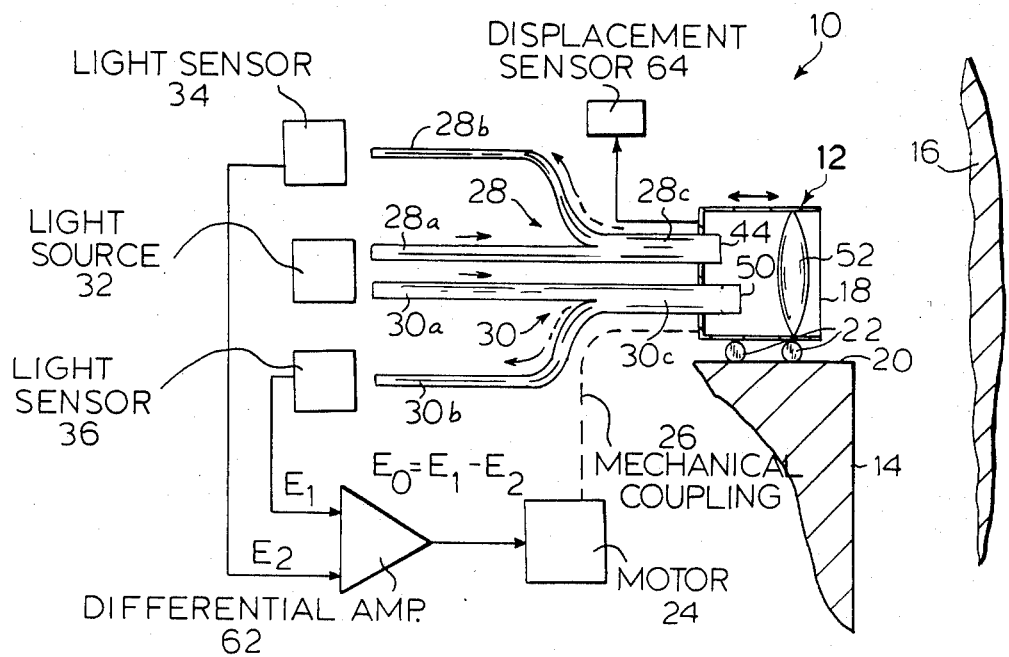
FIG. 1 shows, in a partial schematic form, the elements of a fiber optic proximity sensor constructed in accordance with the present invention.

Referring now to FIG. 1, a fiber optic proximity sensor 10, according to this invention, comprises a sensor head 12 which is movable with respect to a platform 14 to track a target 16. More particularly, the sensor is provided with a servo loop for maintaining the head at a preselected constant distance from target 16.

Preferably sensor head 12 includes a carriage 18 which rides on suitable bearings 22, as shown over a top surface 20 of platform 14. A motor 24 drives carriage 18 through a coupling 26 to move carriage 18 toward or away from target 16. Coupling 26 may comprise a rod linearly reciprocated by the motor, or a gear 27 rotated by motor 24 and cooperating with a nut 29 affixed to the carriage (shown in FIG. 2) or other coupling elements well known in the art. Alternatively, the carriage could be directly coupled to a linear motor which may have a faster response than the rotary motor.

The sensor 10 also comprises two bifurcated fiber optic bundles 28 and 30. Bundle 28 is formed with two arms 28a, 28b, each composed of a plurality of optical fibers. The fibers of the two arms are joined together to form leg 28c. Similarly, bundle 30 has leg 30c having optical fibers which are partitioned to form arms 30a and 30b.

For the sake of convenience the fibers making up arms 28a and 30a shall be called transmitter fibers to indicate that their function is to transmit light to the target 16. Similarly, the fibers of arms 28b and 30b shall be called the receiver fibers to indicate that their function is to receive light reflected by the target.

The sensor also includes a light source 32 coupled to arms 28a, 30a, a first light sensor 34 coupled to arm 28b and a second light sensor 36 coupled to arm 30b. The outputs 38, 40 of the two light sensors 34, 36 are sent to a differential amplifier 42 which controls the motor 24, thereby completing the servo loop.

Bundle 28 has a front face 44 which is disposed substantially in parallel with target 16. Similarly, bundle 30 also has an end with a front face 50 which is generally in parallel with target 16 as shown. Between front faces 44, 50 and target 16 there is a lens 52. A front portion of legs 28c, 30c and the imaging means such as lens 52 are affixed to carriage 18 so that front faces 44, 50 are moved toward or away from the target while the distances between faces 44, 50 and lens 52 remain constant at all times.

The operation of the sensor shall now be described in conjunction with the figures. Light from source 32 propagates through arms 28a, 30a and legs 28c, 30c and is focused from front faces 44, 50 by lens 52 on target 16. (The path of the light from the source 32 to the target is indicated in FIG. 1 by the solid arrows. The path 2 of the light reflected by the target is indicated by broken arrows).

Figure 2:
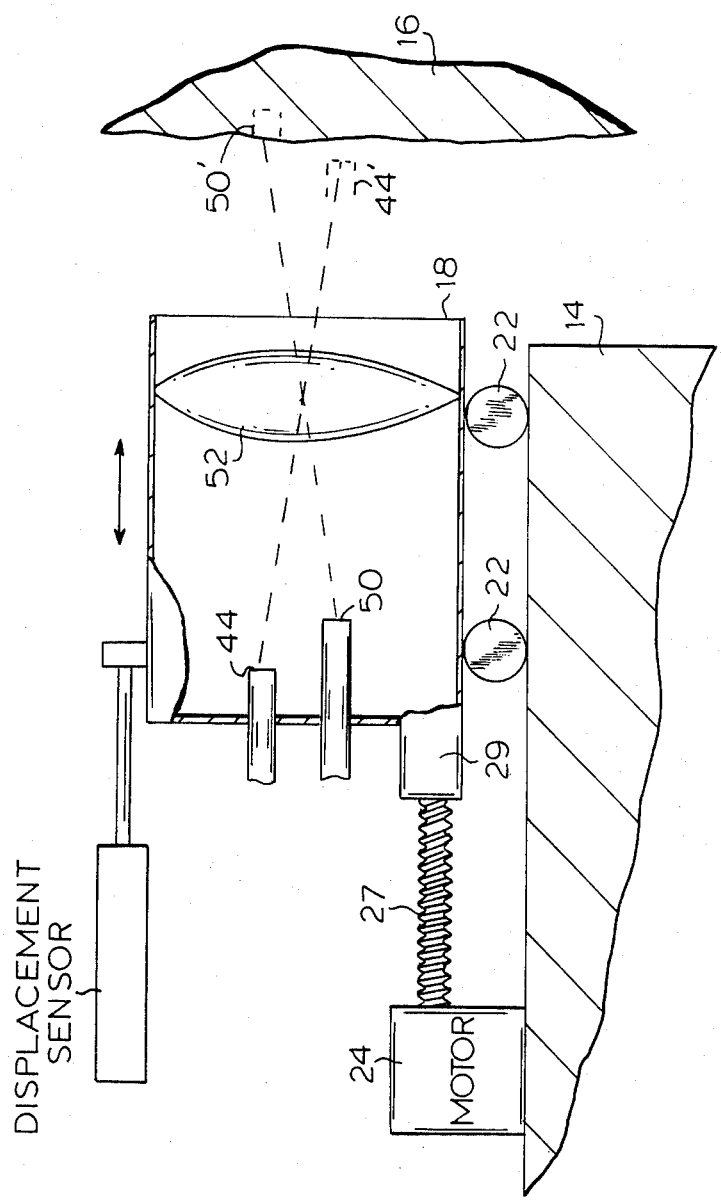
FIG. 2 shows details of the proximity sensor head of the sensor of FIG. 1.

As shown more clearly in FIG. 2, the distances between front faces 44, 50 and lens 52 are fixed so that as the carriage moves towards or away from the target, lens 52 projects two images toward the target with faces 44', 50' corresponding to faces 44, 50 which lie in two different parallel planes.

Figure 3:
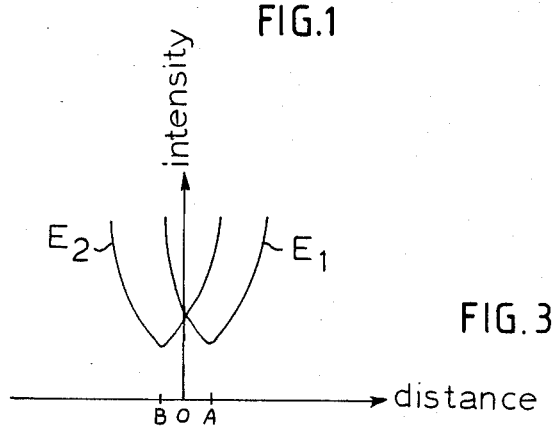
FIG. 3 shows a graphical representation of the signals generated by the light sensors of the proximity sensor of FIG. 1.

Preferably, the carriage is positioned so that the target is disposed between the planes of these images 44', 50'. When the target 16 coincides with image 44', the light from bundle 28 appears on the target in the form of bright circles which are reflected back on face 44 so that the image of each transmitter fiber corresponds to the fiber itself. As a result virtually no light enters the receiver fibers. As the distance to the target changes, the images become blurred so that more light enters the receiver fibers. Thus, the light level detected by light sensor 34 is lowest when the image 44' coincides with target 16. Similarly, the light level detected by sensor 36 is at a minimum when image 50' coincides with the target 16. The outputs $E_1$ and $E_2$ of these sensors are shown in FIG. 3, points A and B indicating the minimum levels of $E_1$ and $E_2$ respectively. At point 0 which is approximately half way between A and B the two intensities are equal.

The two sensor signals $E_1$ and $E_2$ are fed into a differential amplifier 42 which generates a control signal $E_0$ equal to the difference between $E_1$ and $E_2$. Thus, at point 0 the control signal crosses the horizontal axis.

Figure 4:
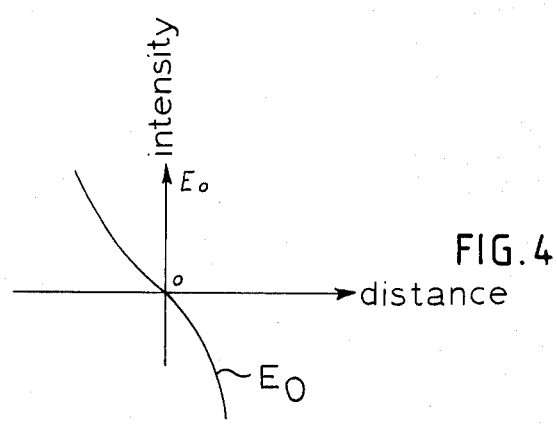
FIG. 4 shows a graphical representation of the control signal which results from taking the difference of the signals of FIG. 3.

The control signal $E_0$ is used as a feedback signal to motor 24 as shown in FIG. 1 so that the motor tends to keep sensor head 12 at a constant distance (corresponding to the null point of FIG. 4) from target 16.

The position of sensor head 12 is monitored by a displacement sensor 64 which therefore indicates the distance to target 16.

Obviously, numerous modifications can be made to the invention without departing from its scope as defined in the appended claims.

What is claimed is:

1. A proximity sensor for determining a distance to a target comprising:
    a light source;
    first and second bifurcate bundles of optical fibers;
    first and second light detectors for generating first and second detected sensor signals corresponding to the light intensities detected by the detectors;
    imaging means;
    said first and second bundles having respective first and second front faces and being positioned and arranged to direct light from said light source to said target through said imaging means and to transmit reflected light from said target to the first and second sensors respectively to generate sensor signals which have equal amplitudes when said bundles are at a preselected distance from the target;
    means for generating a control signal corresponding to the difference between said first and second detector signals; and
    means for moving said imaging means in accordance with said control signal for tracking said target while maintaining a constant distance between said faces and said imaging means.

2. A proximity sensor for tracing a target comprising:
    a light source;
    a platform;
    an imaging lens;
    first and second light detectors for generating first and second detector signals respectively corresponding to light detected by the detectors;
    a first bundle of optical fibers having a first arm with first transmitter fibers for receiving light from said light source and transmitting the light to said target through said lens, a second arm with first receiver fibers for transmitting light through said lens from said target to said first detector, and a first leg including the fibers of said first and second arm;
    a second bundle of optical fibers having a first arm with second transmitting fibers for transmitting light from said source to said target through said lens, a second arm with second receiver fibers for transmtting light through said lens from said target to said detector, and a second leg including the fibers of said first and second arms;
    control means for generating a control signal proportional to a difference between said first and second detector signals; and
    means for moving said first and second legs and said lens with respect to said platform in accordance with said control signal to minimize said difference.

3. The sensor of claim 2 wherein said first leg and second leg are offset in a direction parallel to the movement of the first and second legs.

4. The sensor of claim 3 wherein said sensor further comprises a carriage movable on said platform, said carriage supporting said lens and at least a portion of said first and second leg.

5. The sensor of claim 4 wherein said lens is disposed on said carriage at a preselected distance from said second leg and between said second leg and the target.

6. The sensor of claim 5 wherein said control means includes a differential amplifier having said first and second signals as its input signals.

7. The sensor of claim 6 wherein said means for moving includes a rotary motor operated in accordance with said control signal and coupling means for coupling the motor to said carriage.

8. The sensor of claim 6 wherein said means for moving includes a linear motor coupled to said carriage.

* * * * *